No. 807,023. PATENTED DEC. 12, 1905.
C. W. GARDNER.
GOLD WASHING AND SEPARATING SCREEN.
APPLICATION FILED MAR. 9, 1905.
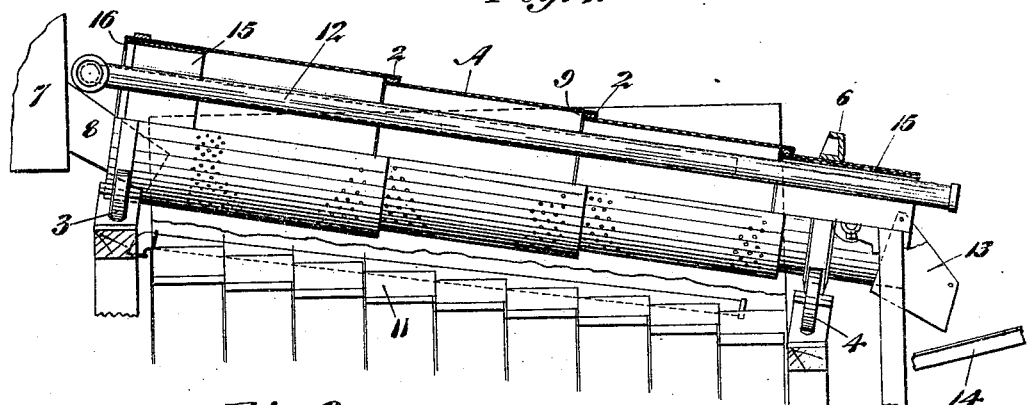
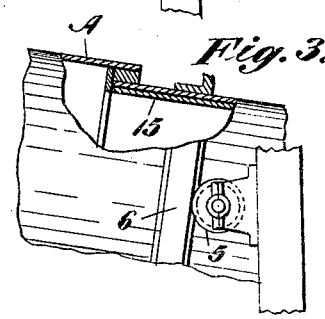
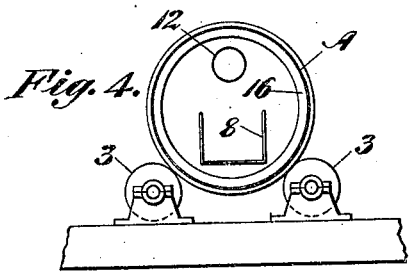
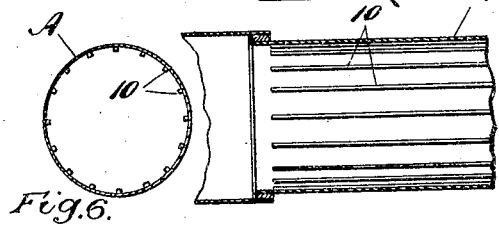
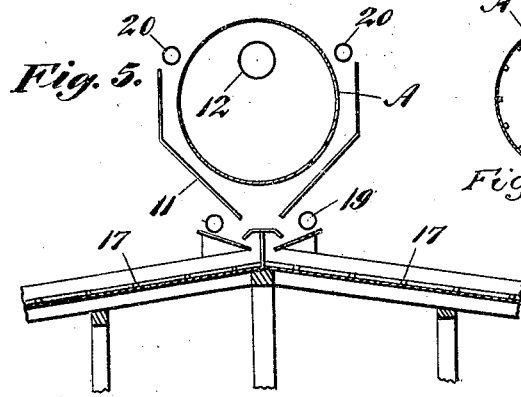
Witnesses,
Chas. E. Chapin.
Inventor,
Charles W. Gardner
By Geo. H. Strong. Atty.

UNITED STATES PATENT OFFICE.

CHARLES W. GARDNER, OF OROVILLE, CALIFORNIA.

GOLD WASHING AND SEPARATING SCREEN.

No. 807,023.　　　Specification of Letters Patent.　　　Patented Dec. 12, 1905.

Application filed March 9, 1905. Serial No. 249,225.

*To all whom it may concern:*

Be it known that I, CHARLES W. GARDNER, a citizen of the United States, residing at Oroville, in the county of Butte and State of California, have invented new and useful Improvements in Gold Washing and Separating Screens, of which the following is a specification.

My invention relates to an apparatus which is especially designed for the separation of gold and precious metals from sand, gravel, or other gangue or material with which it may be associated.

It consists of a revoluble inclined screen made in sections of constantly-decreasing diameter from the upper receiving end toward the lower discharge end and in a water-supply and mechanical devices used in conjunction therewith.

It also comprises details of construction which will be more fully explained by reference to the accompanying drawings, in which—

Figure 1 is a side elevation of my screen, partly in section. Fig. 2 is a partial section of upper end. Fig. 3 is a partial section of lower end. Fig. 4 is an upper end view showing supporting-rollers. Fig. 5 is a cross-section of screen and housing. Fig. 6 is a cross-section, and Fig. 6ª is a plan, of second section from the top, showing a modified form.

For the separation of gold and other metallic or heavy substances from sand, gravel, clay, or other adherent or associated material various forms of separating tables or screens, either flat or cylindrical, have been employed.

In my invention I have designed a revoluble screening apparatus so constructed as to prevent a too rapid flow of the material by reason of the rush of water through the apparatus, means for checking said flow and subjecting the material for a longer interval to the action of the apparatus, means for protecting the apparatus from undue wear, and means for collecting and saving the gold after its separation.

As shown in the present arrangement of my apparatus, it consists of a series of substantially cylindrical or polygonal sections which are put together so as to form a tube in which the sections are of successively-decreasing diameter from end to end.

It will be understood that the tube may be made cylindrical or of flat sections united in the form of a polygon, and the surface is perforated with holes of any suitable or required size. The sections are united by intermediate rings, as at 2, or in other equivalent manner, so as to form a continuous tube, and this tube is mounted upon rollers, as at 3 and 4, the rollers 3 being journaled to support the upper and larger end of the tube, and the rollers 4 are journaled to support the lower and smaller end, and power may be applied through either of said sets of rollers to revolve them, and through the frictional contact with the bearing on the tube or on the cylinder the latter will be revolved, or other equivalent means. This cylinder is supported upon the rollers at an angle, as shown, the larger section being at the upper end and the smaller, at the discharge end.

In order to retain the cylinder in its proper plane of rotation and resist any tendency to move down the incline at which it stands, any suitable thrust-bearing may be employed. I have here illustrated such a bearing as in the form of rollers 5, journaled to a fixed support and contacting with a ring or flange, as at 6, fixed upon some part of the cylinder.

The peripheral walls of all the sections of the cylinder may be perforated with holes. If the gold to be saved is of an even fineness, the holes in all the sections may be of substantially the same diameter. If there is a considerable variety in the size of the gold particles, the different sections may have the perforations correspondingly varied.

The apparatus here shown has been designed for use in connection with gold-dredgers where the sand and associated gold are lifted from the bottom of the stream and being associated with considerable water is discharged first into a receiver, as at 7, and from this receiver by means of a chute 8 the material is delivered into the upper and larger end of the apparatus. The screen is revolved at any suitable or desired rate of speed, and its revolution causes the sand and other associated material to be continuously agitated as it passes down the screen-surface, and this agitation and the consequent rubbing will in case of adherent clay or earth tend to separate the gold from such substance and allow it to pass through the holes in the screen. Any gravel or larger material will continue to flow down the first section of the screen and will be arrested by the shoulder formed at its junction with the next smaller section of the screen.

Each screen operates in the same manner, each annular shoulder successively arresting the material and subjecting it longer to the action of the water and screen.

A very important advantage of this construction is that it prevents the material from being carried through the screen too rapidly by reason of the rush of water, and as the material is arrested against the annular shoulders it is revolved and subjected to the abrading influences, and the gold is thus more completely separated to pass through the screen. A further object in this construction is to cause a more easy flow over the surface. Thus if a cylindrical or continuously-tapering screen be employed and annular dams or ribs be placed in such a screen to prevent too rapid a rush through it the material will be obliged to rise over the annular rings and will drop upon the screen on the other side. Experience has shown that the screens will thus be very rapidly worn.

In my construction when the material has risen high enough to pass into the next smaller section it simply flows easily and without any impact upon the surface of the screen, the only wear being that caused by the constant flow and rubbing of the material. In order to further protect the junction of the screens from wear, I have shown annular steel rings 9, which are fixed to the inner faces of the annular rings to which the contiguous screen-sections are joined. These rings 9 being of hard steel will resist a great deal of wear and when worn out may be easily replaced, thus greatly increasing the life of the apparatus. If it is found desirable to agitate and rub the material more thoroughly than can be done by comparatively smooth interior surfaces of the screen, I may fix into each screen-section longitudinally-disposed bars 10. These bars being bolted through the sides of the screen or otherwise affixed and extending along the inner surface of the screen they act as lifters as the screen is revolved and carry the material a little way up, allowing it to fall off by gravitation, thus increasing the abrading action and separation of the gold.

The material passing through the perforations in the screen may be received and directed by any suitable housing or arrangement within which the screen revolves, as at 11.

In order to more thoroughly separate the material passing through the screen, I have shown perforated water-pipes 12, and the flow of water through these pipes may be controlled in any suitable manner.

Coarser gravel and material will be delivered through the lower end of the screen apparatus by means of a chute, as at 13, and may be received by an elevator or stacker of any suitable description, as at 14, by which the waste material thus discharged is conveyed away.

Wear-plates may be fixed in the upper and lower ends of the screen, respectively, as shown at 15, and a flanged or angle-iron ring, as at 16, fixed in the upper end of the screen, prevents backflow of material which is delivered through the chute 8.

The material discharged into the housing is directed upon distributing-tables, as shown at 17, these tables being provided with riffles adapted to arrest and save the gold.

Water-pipes (shown at 19 and 20) serve to supply the requisite water for further separating the waste material from the gold and produce a uniform flow over the tables. It will be understood that these devices, which are supplemental to my screen, may be variously arranged to suit conditions or requirements under which they are operative.

Having thus described my invention, what I claim, and desire to secure by Letters Patent, is—

1. A tubular, perforated, revoluble metallic screen supported at an inclination, said screen being formed in sections diminishing in diameter from the upper to the lower end to form a series of dams adapted to retard the passage of material and cause the same to overflow into the smaller succeeding sections.

2. An inclined, tubular, revoluble screen consisting of perforated metallic sections of gradually-decreasing diameter, said sections each having a substantially uniform diameter from end to end, and having overlapping meeting ends, rings to which the meeting ends of the sections are secured, said rings forming dams adapted to retard the passage of the material and cause the same to overflow into the smaller succeeding sections, tread-bands surrounding the screen, and journaled rollers upon which said bands are supported.

3. An inclined, tubular, revoluble screen consisting of perforated metallic sections of gradually-decreasing diameter said sections each having a uniform diameter from end to end and having overlapping meeting ends, rings to which the meeting ends of the sections are secured said rings forming dams adapted to retard the passage of material and cause the same to overflow into the smaller succeeding sections, tread-bands surrounding the screen, rollers upon which the bands are supported and through which motion is transmitted to the screen, and thrust-bearing rollers adapted to prevent longitudinal movement of the screen in the direction of its axis.

4. An inclined, perforated revoluble cylinder composed of metallic sections decreasing in diameter from the upper to the lower end said sections each having a uniform diameter from end to end and one fitting within the other to form dams which retard the passage of material and cause the same to overflow into the smaller succeeding sections, and annular wear-plates fixed at the dams.

5. An inclined, perforated, revoluble screen, said screen composed of tubular metallic sections of successively-decreasing diameter from the upper to the lower end, and each having a uniform diameter from end to end, said sections fitting one within the other to form dams adapted to retard the passage of material and cause the same to overflow into the smaller succeeding sections, annular wear-plates fixed at the meeting ends of contiguous sections, rollers supporting the screen and communicating motion thereto, means for supplying material at the upper end of the screen, an annular upwardly-projecting flange to prevent backflow of material, and means for discharging waste at the lower end of the screen.

In testimony whereof I have hereunto set my hand in presence of two subscribing witnesses.

CHARLES W. GARDNER.

Witnesses:
A. E. BOYNTON,
J. M. PETERS.